(12) United States Patent
Huang

(10) Patent No.: US 9,533,443 B1
(45) Date of Patent: Jan. 3, 2017

(54) ANTI-FALLING MOLD PROTECTION DEVICE FOR AN AUTOMATIC MOLD OPENING AND CLOSING MACHINE

(71) Applicant: TIEN KANG CO., LTD., Taichung (TW)

(72) Inventor: David Huang, Taichung (TW)

(73) Assignee: TIEN KANG CO., LTD. (TW)

( * ) Notice: Subject to any disclaimer, the term of this patent is extended or adjusted under 35 U.S.C. 154(b) by 3 days.

(21) Appl. No.: 14/804,308

(22) Filed: Jul. 20, 2015

(51) Int. Cl.
| | | |
|---|---|---|
| *B29C 45/84* | (2006.01) | |
| *B29C 45/03* | (2006.01) | |
| *B29C 45/67* | (2006.01) | |
| B29C 33/30 | (2006.01) | |
| B29C 45/17 | (2006.01) | |

(52) U.S. Cl.
CPC ............. *B29C 45/84* (2013.01); *B29C 45/03* (2013.01); *B29C 45/67* (2013.01); *B29C 33/305* (2013.01); *B29C 45/1742* (2013.01)

(58) Field of Classification Search
CPC ..... B29C 45/84; B29C 45/1742; B29C 33/305
USPC ........................................................ 425/153
See application file for complete search history.

(56) References Cited

U.S. PATENT DOCUMENTS 8,900,494 B2 * 12/2014 Notter .................... B29C 33/30
264/328.1

FOREIGN PATENT DOCUMENTS

DE    10 2011 010 953    * 8/2012

* cited by examiner

*Primary Examiner* — James Mackey
(74) *Attorney, Agent, or Firm* — Bruce Stone LLP; Joseph A. Bruce

(57) ABSTRACT

An anti-falling protection device for an automatic mold opening and closing machine is used on a mold mounting unit to secure or release an upper mold with a pair of wings, and is provided with a movable member movably disposed on the mold mounting unit, two protection members movably provided along two lateral surfaces of the mold mounting unit, a power unit which extends and retracts between a first position and a second position, and the connecting member connected between the power unit and the movable member. When in the first position, the power unit drives the two protection members to move toward the power unit and make the protection members stop beneath the wings, and when in the second position, the piston drives the two protection members to move away the wings of the upper mold.

4 Claims, 9 Drawing Sheets

ANTI-FALLING MOLD PROTECTION DEVICE FOR AN AUTOMATIC MOLD OPENING AND CLOSING MACHINE

BACKGROUND OF THE INVENTION

Field of the Invention

The invention relates to an automatic mold opening and closing machine, and more particularly to an anti-falling mold protection device for an automatic mold opening and closing machine.

Related Prior Art

A mold assembly can generally be divided into an upper mold and a lower mold by the joint surface. A part of the mold cavity is formed in the upper mold, another part is formed in the lower mold, and when the upper and lower molds are closed, the mold cavity will be filled with material which will be molded into a finally product after cooling off. When the mold assembly is applied in a vertical injection molding machine for automatic molding, it requires an automatic mold opening and closing device to perform opening and closing of the mold assembly in an automatic manner.

The automatic mold opening and closing device includes a base for mounting of a lower mold, a pivot seat pivotally disposed between a first position and a second position on the base, and a mold mounting unit disposed on the pivot seat to clamp or release an upper mold. When the pivot seat is in the first position, the mold mounting unit will be lowered down to clamp the mold or to move the mold downward, when the pivot seat is in the second position, the mold mounting unit and the mold will rotate an angle to finish the action of opening the mold.

SUMMARY

An embodiment of the invention is to provide an anti-falling protection device for an automatic mold opening and closing machine, which is capable of prevent the upper mold from falling down to the ground when the mold clamping unit which clamps the upper mold loses clamping ability, so as to further protect other components of the automatic opening and closing machine from being damaged by the falling upper mold.

An anti-falling protection device for an automatic mold opening and closing machine in accordance with an embodiment of the invention is suitable for use on a mold mounting unit to secure or release an upper mold which is provided with a pair of wings. The anti-falling protection device is provided with a movable member, two protection members, a power unit and a connecting member. The movable member is movably disposed on a top surface of the mold mounting unit and includes a first movable portion and a second movable portion connected to the first movable portion. The two protection members are driven by the movable member to move along the two lateral surfaces of the mold mounting unit, and each include a fixing portion fixed to the first movable portion of the movable member, a middle portion connected to the fixing portion and located toward the lateral surfaces of the mold mounting unit, and a protection portion connected to the middle portion to support or release the wings of the upper mold. The power unit includes a cylinder and a piston which extends and retracts between a first position and a second position, the piston includes a rod portion which is exposed out of the cylinder and fixed on a surface of the mold mounting unit. The connecting member includes a first connecting portion connected to the cylinder, and a second connecting portion connected to the first connecting portion and the second movable portion of the movable member. When in the first position, the piston drives the movable member and the two protection members to move toward the power unit until the protection portions of the respective protection members are moved to a position beneath the wings of the upper mold, when in the second position, the piston drives the movable member and the two protection members to move away from the power unit, so that the protection portions of the protection members are moved away from the wings of the upper mold.

Preferably, a mold clamping unit is disposed at each of the lateral surfaces of the mold mounting unit to clamp the wings of the upper mold.

Preferably, the anti-falling protection device for an automatic mold opening and closing machine further includes two restricting members, the first movable portion of the movable member is provided with two slots, each of the restricting members includes a restricting portion fixed at the top surface of the mold mounting unit and located in the slots, and an expansion portion connected to the restricting portion and abutted against the top surface of the first movable portion.

Preferably, the middle portion of the respective protection members is located a distance from the lateral surfaces of the mold mounting unit.

DETAILED DESCRIPTION

Figure 1:
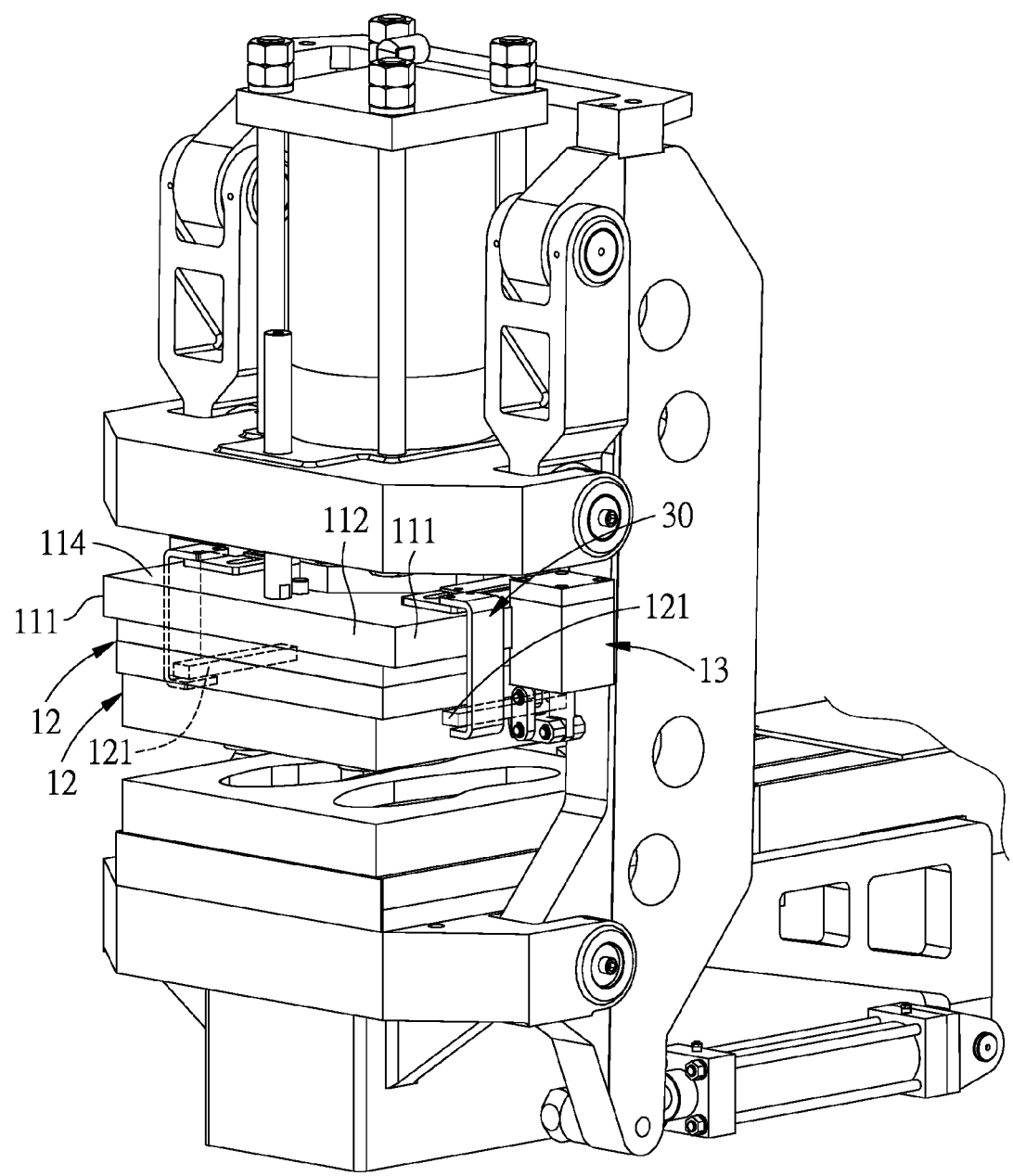
FIG. 1 is a perspective view of an anti-falling protection device for an automatic mold opening and closing machine in accordance with the present invention.
Figure 2:
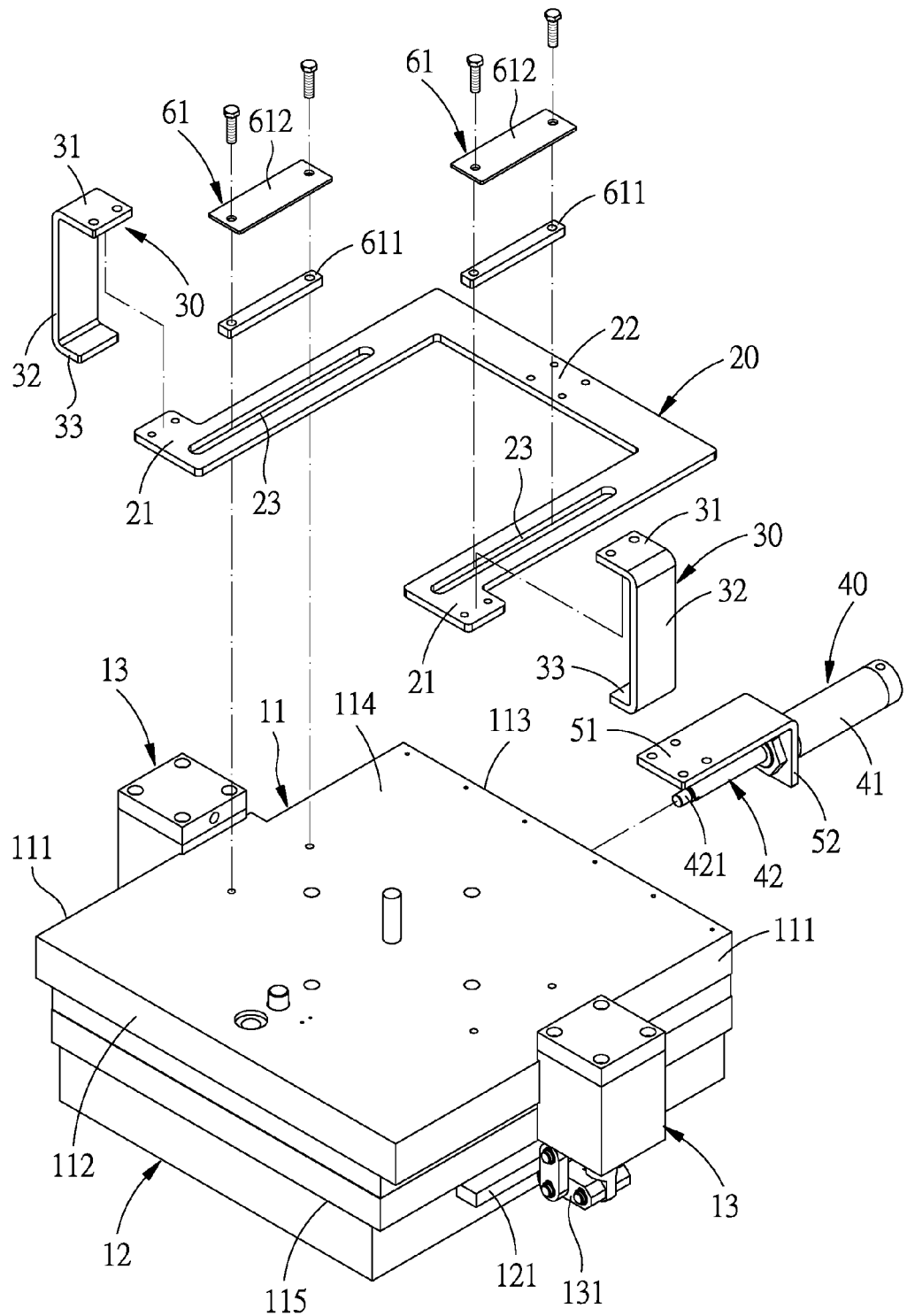
FIG. 2 is an exploded view of the anti-falling protection device and the automatic mold opening and closing machine in accordance with the present invention.
Figure 3:
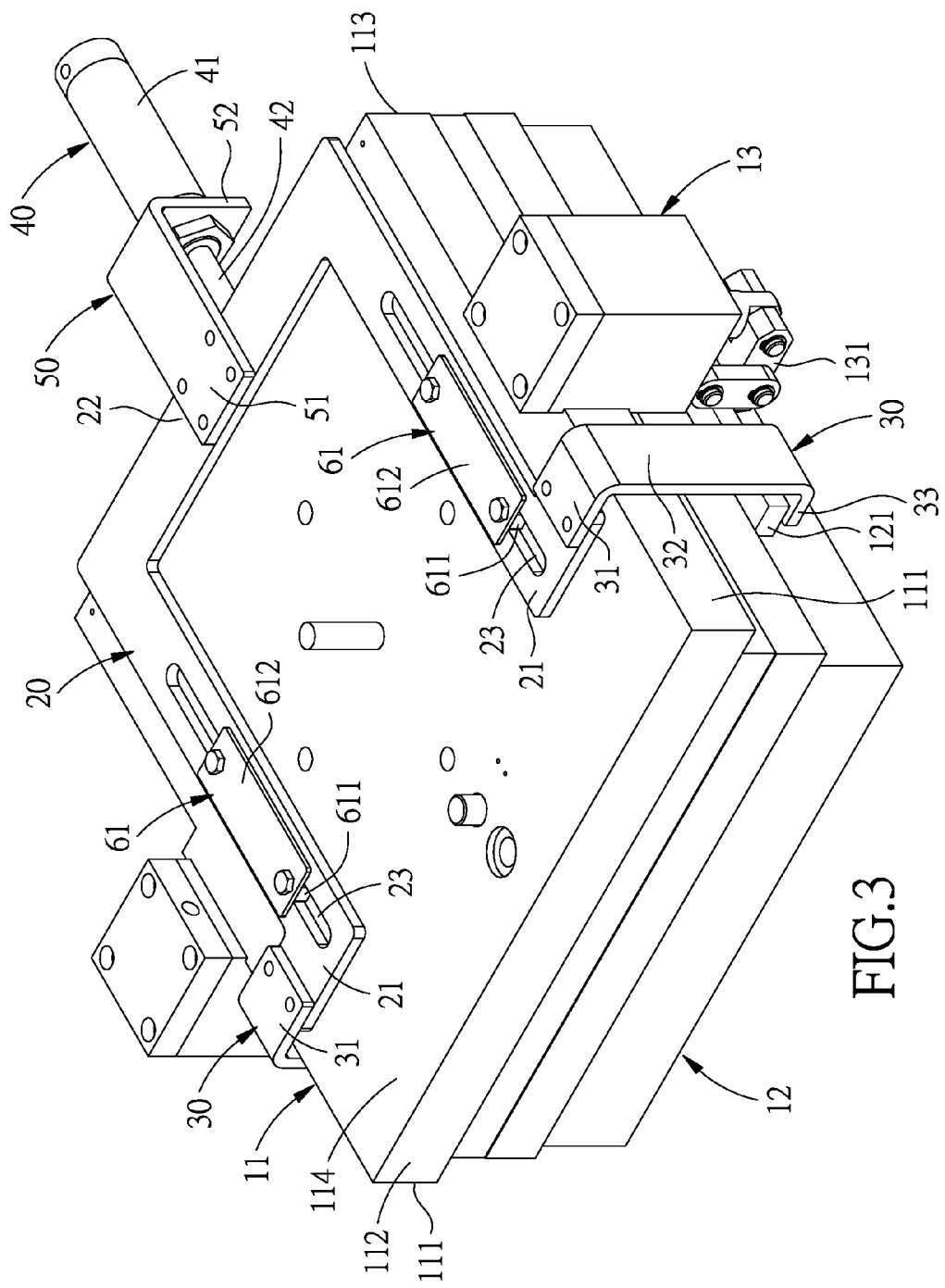
FIG. 3 is an assembly view of the anti-falling protection device for an automatic mold opening and closing machine in accordance with the present invention.
Figure 4:
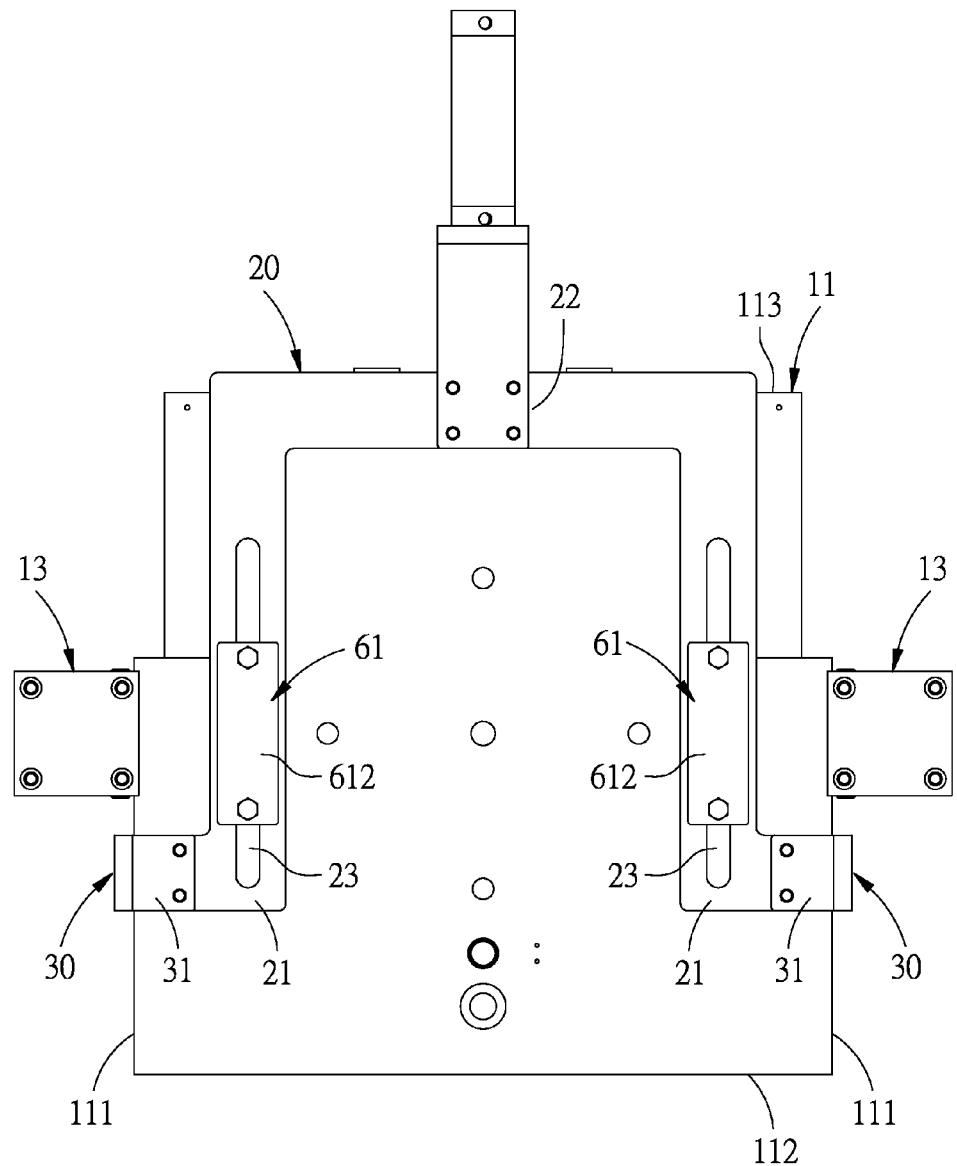
FIG. 4 is a top view of the anti-falling protection device for an automatic mold opening and closing machine in accordance with the present invention, showing that the piston is in the first position.

The invention will be clearer from the following description when viewed together with the accompanying drawings, which show, for purpose of illustrations only, the preferred embodiment in accordance with the present invention.

Referring to FIGS. 1-6, an anti-falling protection device for an automatic mold opening and closing machine in accordance with the present invention is suitable for use on a mold mounting unit 11 to secure or release an upper mold 12 which is provided with a pair of wings 121. In this embodiment, the mold mounting unit 11 includes two opposite lateral surfaces 111, a front surface 112, a rear surface 113 opposite the front surface 112, a top surface 114 and a bottom surface 115. At each of the lateral surfaces of the mold mounting unit 11 is provided a mold clamping unit 13 which is used to clamp the wings 121 of the upper mold 12. The anti-falling protection device includes: a movable member 20, two protection members 30, a power unit 40 and a connecting member 50.

The movable member 20 is movably disposed on the top surface 114 of the mold mounting unit 11 and movable along a direction from the front surface 112 to rear surface 113, and includes: a first movable portion 21 and a second movable portion 22 connected to the first movable portion 21. In this embodiment, the first movable portion 21 of the movable member 20 is provided with two slots 23 running in the direction from the front surface 112 to the rear surface 113. Two restricting members 61 are used to restrict the movement of the movable member 20, and each include a restricting portion 611 fixed at the top surface 114 of the mold mounting unit 11 and located in the slots 23, and an expansion portion 612 connected to the restricting portion 611 and abutted against the top surface of the first movable portion 21.

The two protection members 30 are driven by the movable member 20 to move along the two lateral surfaces 111 of the mold mounting unit 11, and each include: a fixing portion 31 fixed to the first movable portion 21 of the movable member 20, a middle portion 32 connected to the fixing portion 31 and located toward the two lateral surfaces 111 of the mold mounting unit 11, and a protection portion 33 connected to the middle portion 32 to support or release the wings 121 of the upper mold 12. In this embodiment, the middle portion 32 of the respective protection members 30 is located a distance from the two lateral surfaces 111 of the mold mounting unit 11, and the protection portion 33 is located a little lower than the clamping members 131 of the mold clamping units 13.

The power unit 40 includes a cylinder 41 and a piston 42 which extends and retracts between a first position and a second position. The piston 42 includes a rod portion 421 which is exposed out of the cylinder 41 and fixed on a surface (namely, the rear surface 113) of the mold mounting unit 11.

The connecting member 50 includes a first connecting portion 51 connected to the cylinder 41, and a second connecting portion 52 connected to the first connecting portion 51 and the second movable portion 22 of the movable member 20.

Figure 5:
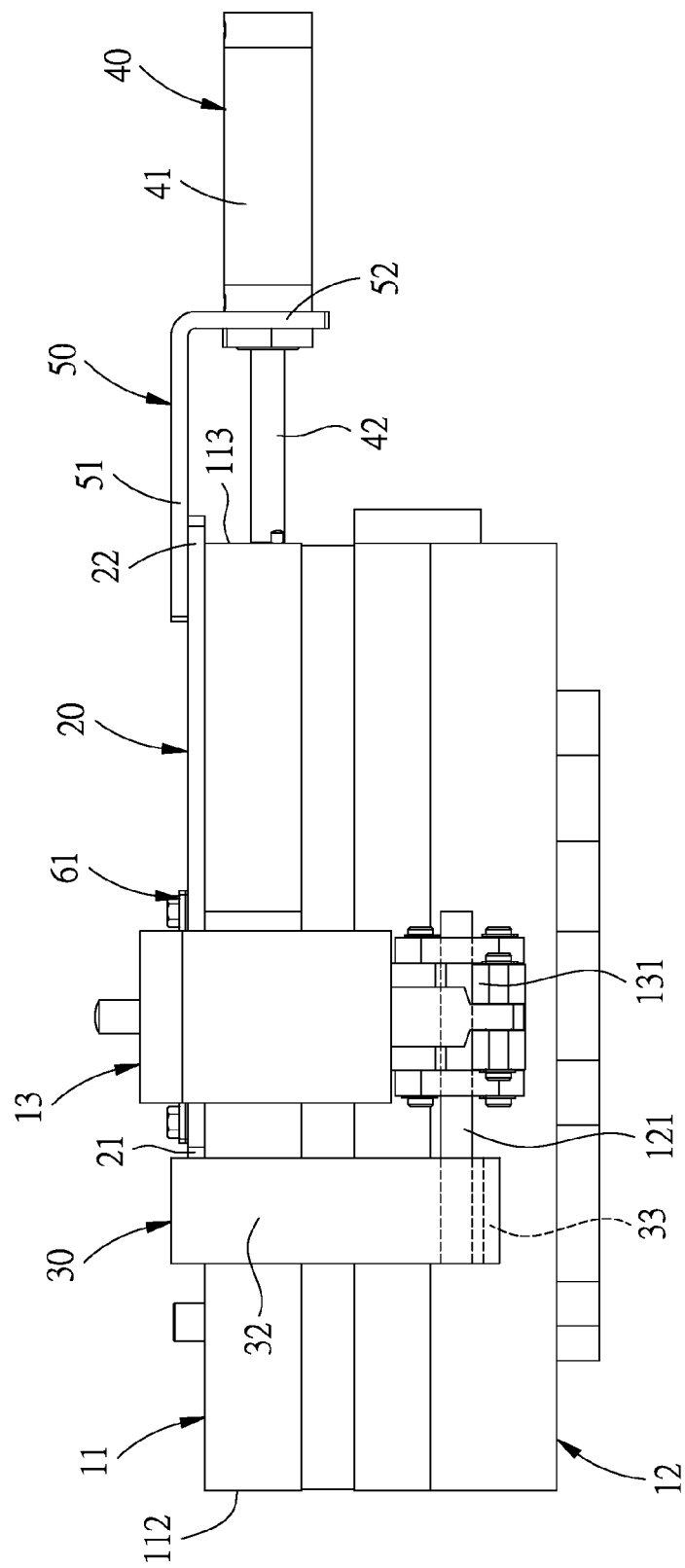
FIG. 5 is a side view of the anti-falling protection device for an automatic mold opening and closing machine in accordance with the present invention, showing that the piston is in the first position, and the protection portions of the protection members are located beneath the wing of the upper mold.
Figure 8:
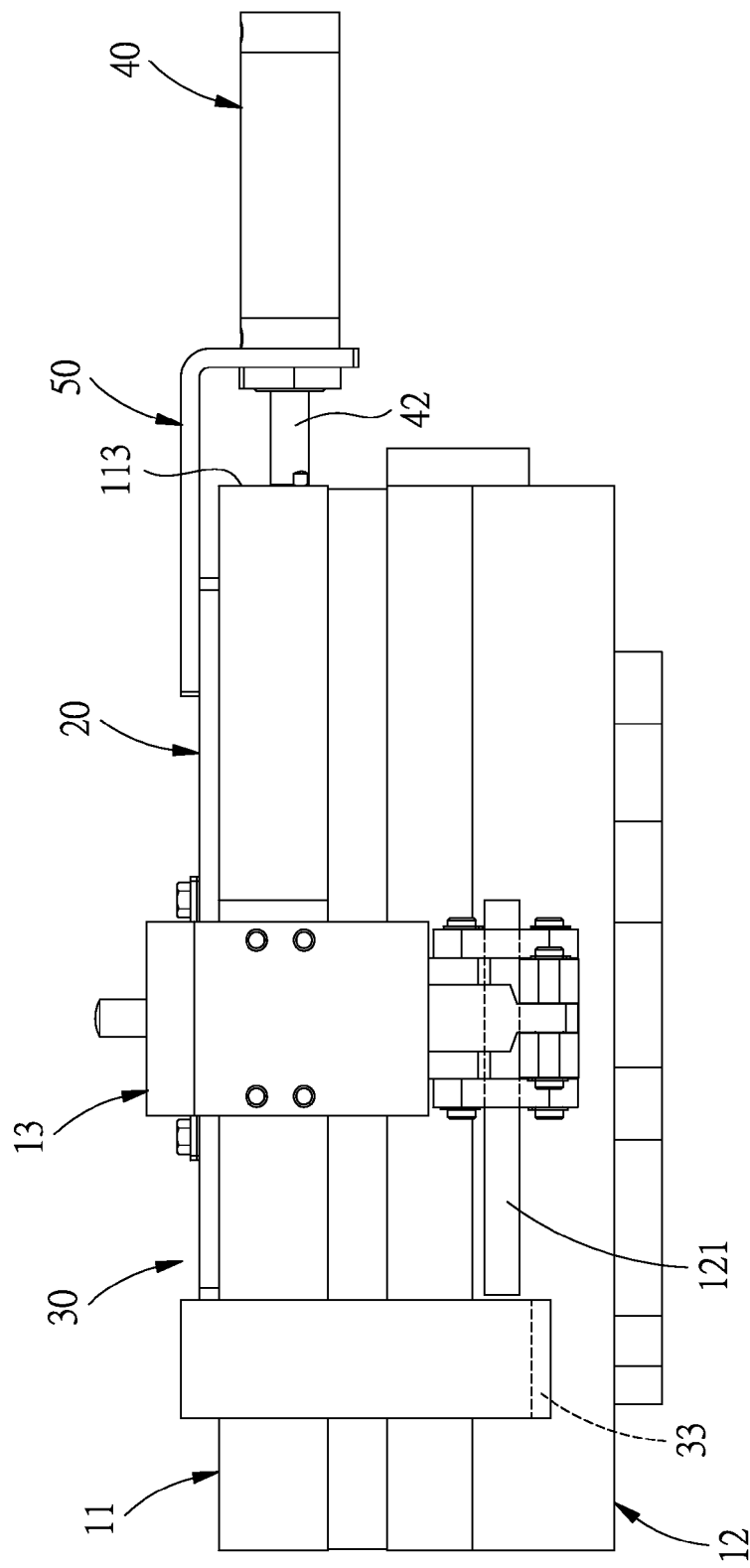
FIG. 8 is a side view of the anti-falling protection device for an automatic mold opening and closing machine in accordance with the present invention, showing that the piston is in the second position, and the protection portions of the protection members are moved from the wings of the upper mold.

When in the first position (as shown in FIG. 5), the piston 42 will drive the movable member 20 and the two protection members 30 to move toward the power unit 40 until the protection portions 33 of the respective protection members 30 are moved to a position beneath the wings 121 of the upper mold 12. When in the second position (as shown in FIG. 8), the piston 42 will drive the movable member 20 and the two protection members 30 to move away from the power unit 40, so that the protection portions 33 of the protection members 30 are moved away from (namely out of the position beneath the wings 121) the wings 121 of the upper mold 12.

What mentioned above are the structural relations of the main components of the embodiment, and for a better understanding of the operation and function of the present invention, please refer to the following descriptions.

When the mold clamping units 13 of the mold mounting unit 11 are clamped against the wings 121 of the upper mold 12, the piston 42 of the power unit 40 can be controlled to extend out into the first position, namely, the cylinder 41 moves in a direction away from the rear surface 113 of the mold mounting unit 11. Since the connecting member 50 is connected to the cylinder 41 and the movable member 20 which is connected to the protection members 30, the protection members 30 will therefore be moved toward the power unit 40 until the protection portions 33 of the respective protection members 30 are moved to a position beneath the wings 121 of the upper mold 12, so as to provide protection to the upper mold 12 when the mold clamping units 13 lose clamping ability.

Figure 6:
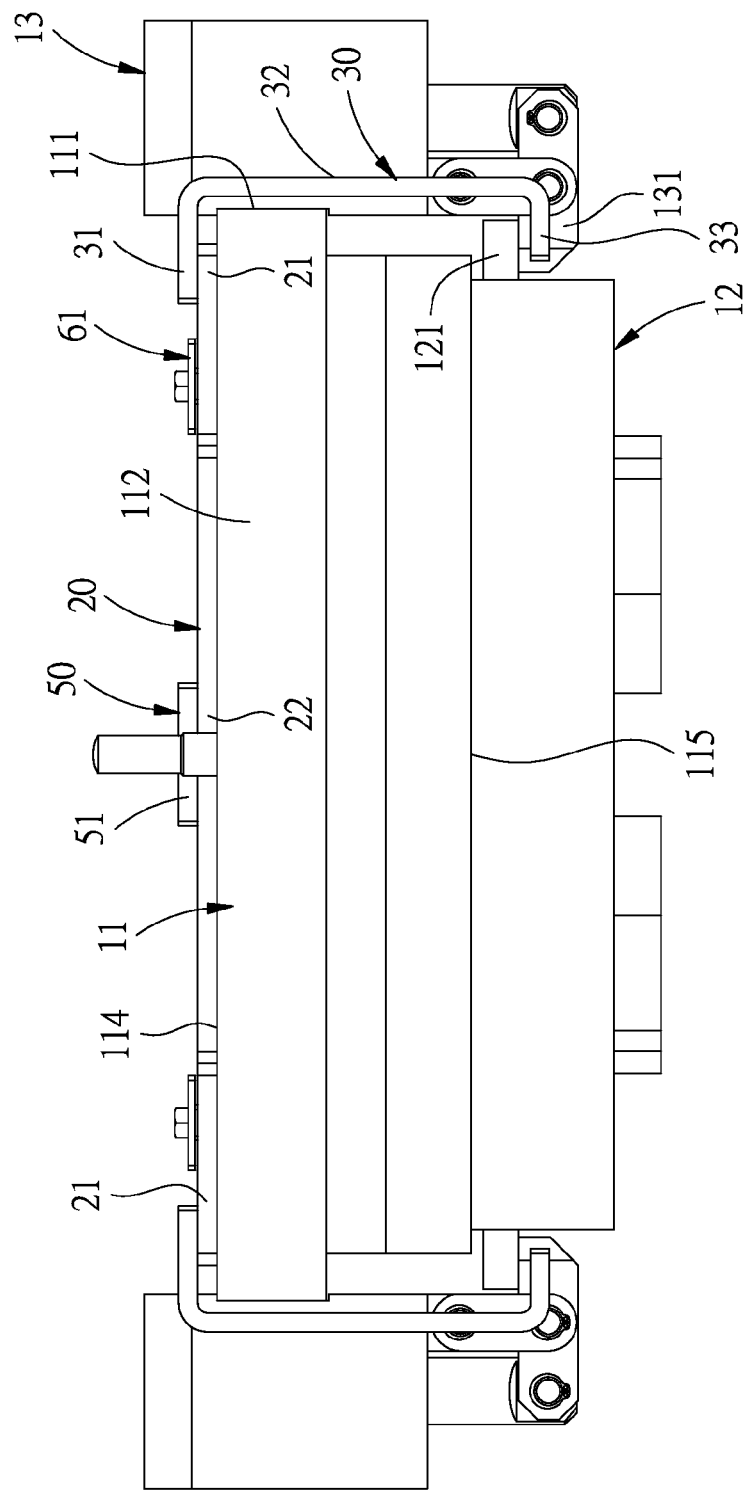
FIG. 6 is another side view of the anti-falling protection device for an automatic mold opening and closing machine in accordance with the present invention, showing that the piston is in the first position, and the protection portions of the protection members are located beneath the wing of the upper mold.
Figure 9:
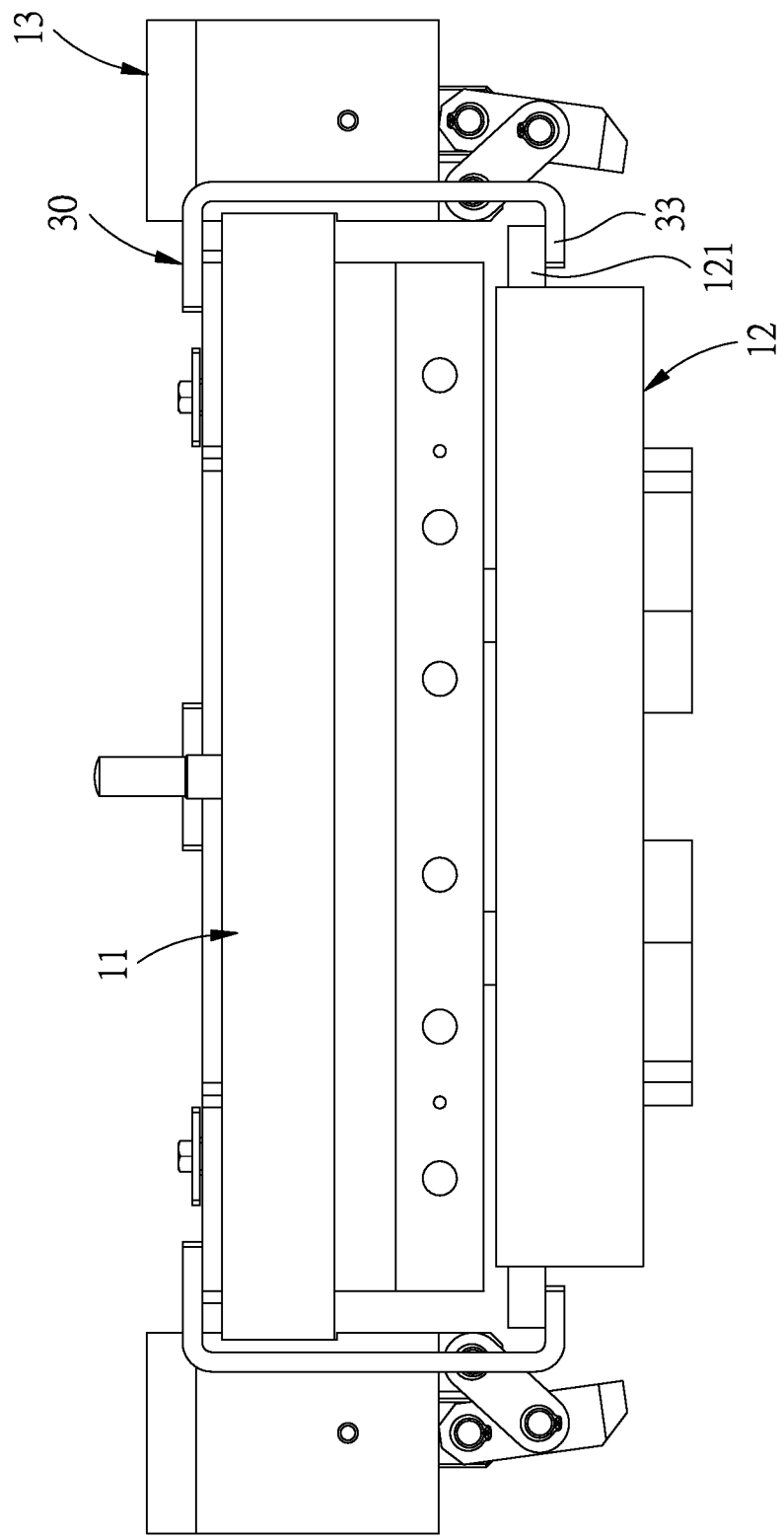
FIG. 9 is a side view of the anti-falling protection device for an automatic mold opening and closing machine in accordance with the present invention, showing that the clamping ability is gone, and the protection portions of the protection members support the wings of the upper mold.

It can be seen from FIG. 6 that the upper mold 12 is clamped at the bottom surface of the mold mounting unit 11 by the mold clamping units 13. When the mold clamping units 13 lose clamping ability, as shown in FIG. 9, the upper mold 12 will be released from the mold mounting unit 11 and the mold clamping units 13, and supported by the protection portions 33 of the protection member 30 at the wings 121 of the upper mold 12, preventing the upper mold 12 from falling down to the ground, and protecting the automatic mold opening and closing machine from being damaged by the falling upper mold 12.

Figure 7:
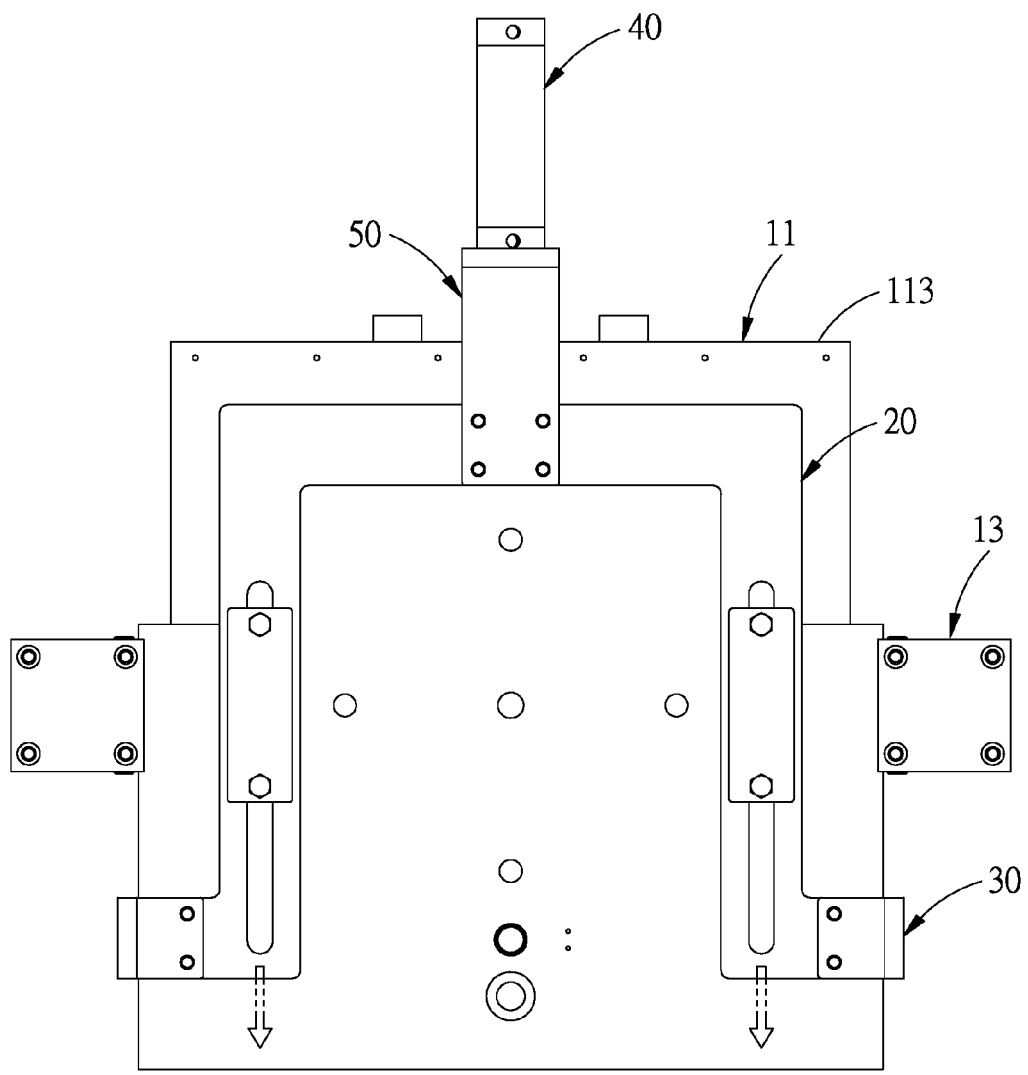
FIG. 7 is a top view of the anti-falling protection device for an automatic mold opening and closing machine in accordance with the present invention, showing that the piston is in the second position.

It is to be noted that when in a state shown in FIG. 5, to release the upper mold 12, the piston 42 of the power unit 40 can be controlled to retract to the second position, as shown in FIGS. 7 and 8, namely, the cylinder 41 moves towards the rear surface 113 of the mold mounting unit 11, due to the connecting member 50, the movable member 20 and the protection members 30 are fixed to one another, the protection members 30 will move away from the power unit 40 to make the protection portions 33 of the protection members 30 disengage from the wings 121 of the upper mold 12. Then, the mold clamping units 13 are controlled to stop clamping the upper mold 12, and release the upper mold 12 from the mold mounting unit 11.

While we have shown and described various embodiments in accordance with the present invention, it is clear to those skilled in the art that further embodiments may be made without departing from the scope of the present invention.

What is claimed is:

1. An anti-falling protection device for an automatic mold opening and closing machine suitable for use on a mold mounting unit to secure or release an upper mold which is provided with a pair of wings, the anti-falling protection device comprising:

a movable member movably disposed on a top surface of the mold mounting unit and including a first movable portion and a second movable portion connected to the first movable portion;

two protection members driven by the movable member to move along the two lateral surfaces of the mold mounting unit, and each including a fixing portion fixed to the first movable portion of the movable member, a middle portion connected to the fixing portion and located toward the lateral surfaces of the mold mounting unit, and a protection portion connected to the middle portion to support or release the wings of the upper mold;

a power unit including a cylinder and a piston which extends and retracts between a first position and a second position, the piston including a rod portion which is exposed out of the cylinder and fixed on a surface of the mold mounting unit;

a connecting member including a first connecting portion connected to the cylinder, and a second connecting portion connected to the first connecting portion and the second movable portion of the movable member;

when in the first position, the piston drives the movable member and the two protection members to move toward the power unit until the protection portions of the respective protection members are moved to a position beneath the wings of the upper mold, when in the second position, the piston drives the movable member and the two protection members to move away from the power unit, so that the protection portions of the protection members are moved away from the wings of the upper mold.

2. The anti-falling protection device for an automatic mold opening and closing machine as claimed in claim 1, wherein a mold clamping unit is disposed at each of the lateral surfaces of the mold mounting unit to clamp the wings of the upper mold.

3. The anti-falling protection device for an automatic mold opening and closing machine as claimed in claim 1 further comprising two restricting members, the first movable portion of the movable member is provided with two slots, each of the restricting members includes a restricting portion fixed at the top surface of the mold mounting unit and located in the slots, and an expansion portion connected to the restricting portion and abutted against the top surface of the first movable portion.

4. The anti-falling protection device for an automatic mold opening and closing machine as claimed in claim 1, wherein the middle portion of the respective protection members is located a distance from the lateral surfaces of the mold mounting unit.

* * * * *